United States Patent Office 3,658,785
Patented Apr. 25, 1972

3,658,785
DISAZO PIGMENTS
Karl Ronco and Willy Mueller, Riehen, Switzerland, assignors to Ciba Limited, Basel, Switzerland
No Drawing. Filed Jan. 22, 1970, Ser. No. 5,145
Claims priority, application Switzerland, Jan. 27, 1969, 1,201/69; Nov. 3, 1969, 16,346/69
Int. Cl. C07c 33/16, 107/04
U.S. Cl. 260—184                   6 Claims ABSTRACT OF THE DISCLOSURE
Disazo dyestuffs of the formula

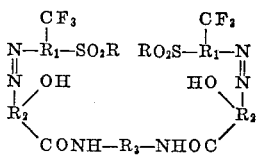

in which $R_1$ represents a benzene radical, $R_2$ represents a naphthalene radical in which the azo, hydroxy and —CO groups are in 1,2,3-position, $R_3$ represents a para-phenylene or diphenylene radical, are valuable pigments which are useful for coloring plastics and lacquers in orange to red shades of excellent fastness.

This invention is based on the observation that new and valuable disazo pigments of the formula

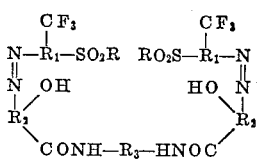

in which $R_1$ represents a benzene residue, $R_2$ represents a naphthalene residue in which the azo, hydroxy and —CO groups are in 1,2,3-position, $R_3$ represents a para-phenylene or a diphenylene residue and R represents an aralkyl or aryl residue, and in which R may also represent an alkyl residue when $R_3$ represents a para-phenylene residue, may be obtained (a) by condensing a carboxylic acid halide of the formula

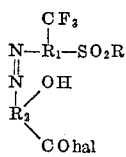

with a para-phenylenediamine or a para-diaminodiphenyl in a molar ratio of 2:1, or (b) by coupling a diazo or diazoamino compound of an amine of the formula

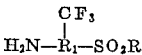

with a 2,3-hydroxynaphthoic acid arylide of the formula

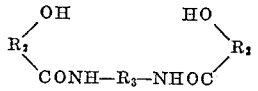

in a molar ratio of 2:1.

Since the products of the invention are pigments, they must not contain groups imparting solubility in water, especially acidic groups imparting solubility in water, for example, sulphonic acid groups or carboxylic acid groups.

Disazo pigments that are of special interest are those of the formula

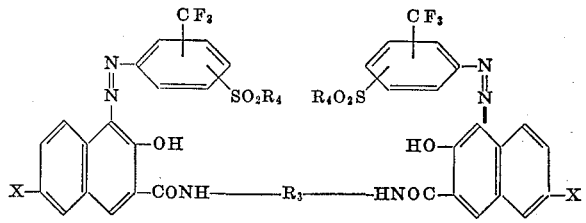

in which X represents a hydrogen or a halogen atom or an alkoxy, cyano or nitro group, and R and $R_3$ have the meanings given above.

The disazo pigments may be further defined as

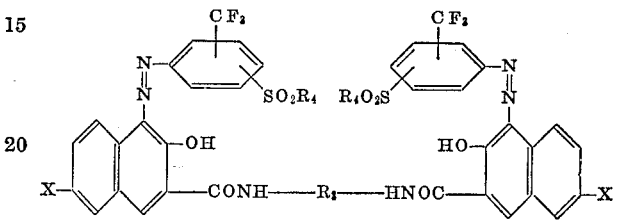

in which X represents hydrogen, chloro, lower alkoxy, cyano or nitro, $R_4$ is naphthyl, phenyl-lower alkylene, unsubstituted phenyl or phenyl substituted by chloro, lower alkyl, phenyl or lower alkoxy, $R_5$ is a member selected from the group consisting of

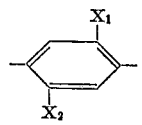

in which $X_1$ and $X_2$ each represents hydrogen, chloro, trifluoromethyl, lower alkyl or lower alkoxy; and

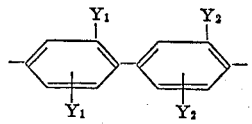

in which each of the symbols $Y_1$ and $Y_2$ represents hydrogen, chloro, lower alkyl or lower alkoxy.

The azo dyestuff carboxylic acids from which the acid halides used in accordance with the invention are derived may be obtained by coupling a diazo compound of a corresponding aminobenzenesulphone with a 2,3-hydroxynaphthoic acid, especially one of the formula

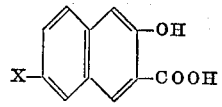

in which X has the meaning given above.
Amines of the formula

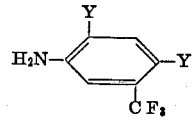

in which one of the symbols Y represents an alkyl, phenalkyl or phenylsulphonyl group and the other symbol Y represents a hydrogen atom, are of special interest as diazo components. The following are given as examples:

5-trifluoromethyl-2-methylsulphonylaniline,
5-trifluoromethyl-2-ethylsulphonylaniline,
5-trifluoromethyl-2-butylsulphonylaniline,
5-trifluoromethyl-2-benzylsulphonylaniline,
5-trifluoromethyl-2-phenylsulphonylaniline,
5-trifluoromethyl-2-(4'-methylphenyl)-sulphonylaniline, 5-trifluoromethyl-2-(4'-chlorophenyl)-sulphonylaniline,
5-trifluoromethyl-2-(2'-chlorophenyl)-sulphonylaniline,
5-trifluoromethyl-2-(4'-methoxyphenyl)-sulphonylaniline,
5-trifluoromethyl-2-(2',4'-dichlorophenyl)sulphonylaniline,
5-trifluoromethyl-2-(2',5'-dichlorophenyl)-sulphonylaniline,
5-trifluoromethyl-2-(3',4'-dichlorophenyl)-sulphonylaniline,
3-trifluoromethyl-4-methylsulphonylaniline,
3-trifluoromethyl-4-ethylsulphonylaniline,
3-trifluoromethyl-4-butylsulphonylaniline,
3-trifluoromethyl-4-benzylsulphonylaniline,
3-trifluoromethyl-4-phenylsulphonylaniline,
3-trifluoromethyl-4-(4'-chlorophenyl)-sulphonylaniline,
3-trifluoromethyl-4-(2'-chlorophenyl)-sulphonylaniline,
3-trifluoromethyl-4-(4'-methylphenyl)-sulphonylaniline,
3-trifluoromethyl-4-(4'-methoxyphenyl)-sulphonylaniline,
3-trifluoromethyl-4-(4'-diphenyl)-sulphonylaniline,
3-trifluoromethyl-4-(2',4'-dichlorophenyl)-sulphonylaniline,
3-trifluoromethyl-4-(2',5'-dichlorophenyl)-sulphonylaniline, and
3-trifluoromethyl-4-(3',4'-dichlorophenyl)-sulphonylaniline.

The azo dyestuff carboxylic acids obtained are treated with substances which are capable of converting carboxylic acids into their acid halides, for example, their chlorides or bromides, such substances being, in particular, phosphorus halides, for example phosphorus pentachloride, phosphorus trichloride or phosphorus pentabromide, phosphorus oxyhalides and preferably thionyl chloride.

The treatment with the said acid halogenating agents is advantageously carried out in an inert organic solvent, for example dimethylformamide, a chlorobenzene, for example monochlorobenzene or dichlorobenzene, toluene, xylene or nitrobenzene. If desired, dimethylformamide may be used in conjunction with the last five solvents specified.

When preparing the carboxylic acid halides, it is generally advantageous first to dry the azo compounds which are prepared in an aqueous medium, or to free them from water by azeotropic distillation in an organic solvent. If desired, azeotropic drying may be carried out immediately before the treatment with the acid halogenating agents.

In accordance with the invention, the monocarboxylic acid halides so obtained are condensed with para-phenylenediamines or para-diaminodiphenyl in a molar ratio of 2:1. It is preferable to use 1,4-diaminobenzenes of the formula

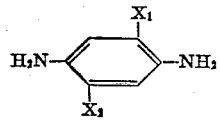

in which $X_1$ and $X_2$ each represents a hydrogen or a halogen atom or preferably an alkyl, alkoxy or trifluoromethyl group. Very good pigments can also be obtained with amines of the diphenyl series, especiall with those of the formula

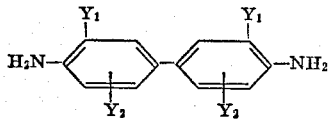

in which each of the symbols $Y_1$ and $Y_2$ represents a hydrogen or a halogen atom or an alkyl or alkoxy group. The following amines are given as examples:

1,4-diaminobenzene,
1,4-diamino-2-chlorobenzene,
1,4-diamino-2-bromobenzene,
1,4-diamino-2,5-dichlorobenzene,
1,4-diamine-2-methylbenzene,
1,4-diamino-2,5-dimethylbenzene,
1,4-diamino-2-methoxybenzene,
1,4-diamino-2,5-dimethoxybenzene,
1,4-diamino-2,5-diethoxybenzene,
2-cyano-1,4-phenylenediamine,
2-trifluoromethyl1,4-phenylenediamine,
2-chloro-5-methyl-1,4-phenylenediamine,
2-chloro-5-methoxy-1,4-phenylenediamine,
2-methyl-5-methoxy-1,4-phenylenediamine,
4,4'-diaminodiphenyl,
3,3'-dichloro-4,4'-diaminodiphenyl,
3,3'-dimethyl-4,4'-diaminodiphenyl,
3,3'-dimethoxy-4,4'-diaminodiphenyl,
2,2'-dimethoxy-5,5'-dichloro-4,4'-diaminodiphenyl,
3,3',5,5'-tetrachloro-4,4'-diaminodiphenyl,
2,2',5,5'-tetrachloro-4,4'-diaminodiphenyl,
3,3'-dichloro-5,5'-dimethyl-4,4'-diaminodiphenyl, and
2,2'-dichloro-5,5'-dimethyl-4,4'-diaminodiphenyl.

Condensation between the carboxylic acid halides as defined above and the amines is advantageously carried out in an anhydrous medium. Under these conditions it generally proceeds surprisingly easily, even at temperatures within the boiling range of the common organic solvents, for example toluene, monochlorobenzene, dichlorobenzene, trichlorobenzene, nitrobenzene and the like. To accelerate the reaction, it is generally advantageous to use an agent capable of binding acid, for example, anhydrous sodium acetate or pyridine. Some of the products obtained are crystalline and some are amorphous and they are generally obtained in a very good yield and in a pure state. It is expedient first to isolate the acid chloride obtained from the carboxylic acids. In some cases however, isolation of the acid chlorides may be omitted without harm and condensation may be carried out immediately after preparation of the carboxylic acid chlorides.

In another embodiment of the invention the new pigments can be obtained by coupling a diazo or diazoamino compound of an amine of the formula

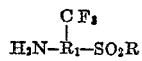

with a 2,3-hydroxynaphthoic acid arylide of the formula

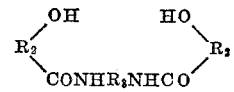

in a molar ratio of 2:1.

The 2,3-hydroxynaphthoic acid arylides required for this process can be prepared by known methods from a 2,3-hydroxynaphthoic acid that may be substituted in 6-position and an arylenediamine in an anhydrous medium, for example toluene, xylene, chlorobenzene and the like, using a condensing agent, for example phosphorous trichloride.

Coupling is effected by grandual addition of the aqueous alkaline solution of the couping component to the acidic solution of the diazonium salt. The alkali hydroxide used to dissolve the coupling componnet is advantageously used in an amount such that there is sufficient present to neutralize the mineral acid liberated from the diazonium salt during coupling. Coupling is advantageously carried out at a pH value of 4 to 6. The requisite pH value is advantageously established by the addition of a buffer. Suitable buffers are for example, the salts, especially the alkali metal salts, of formic acid, phosphoric acid or especially acetic acid. The alakline solution of the coupling component advantageously contains a wetting agent, a dispersing agent or an emulsifying agent, for example an aralkyl sulphonate, for example dodecylbenzene sulphonate or the sodium salt of 1,1'-naphthylmethane sulphonic acid, polycondensation products of alkylene oxides, for example, the product obtained by reacting ethylene oxide with para-tertiary-octylphenol, and also the alkylesters of sulphoricinoleates, for example, n-butylsulphoricinoleate. The dispersion of the coupling component may also advantageously contain protective colloids, for example, methylcellulose or small amounts of inert organic solvents that are sparingly soluble or insoluble in water, for example aromatic hydrocarbons, which may be halogenated or nitrated, for example benzene, toluene, xylene, chlorobenzene, dichlorobenzenes or nitrobenzene, as well as aliphatic halogenated hydrocarbons, for example, carbon tetrachloride or trichloroethylene; also suitable are organic solvents miscible with water, for example acetone, ethylene glycol monomethyl ether, methyl ethyl ketone, methanol, ethanol or isopropanol.

Coupling may also be carried out advantageously by continuously combining an acidic solution of the diazonium salt with an alkaline solution of the coupling component in a mixing nozzle whereby coupling takes place instantaneously. Care must be taken to ensure that the diazo component and coupling component are present in the mixing nozzle in equimolecular amounts, but it is advantageous to use a small excess of coupling component. The simplest way of doing this is to control the pH value of the liquid in the mixing nozzle. Care must also be taken to ensure that the two solutions are in a state of great turbulence in the mixing nozzle. The pigment dispersion formed is removed continuously from the mixing nozzle and the pigment is isolated by filtration.

Coupling can also be carried out by heating a diazoamino compound containing the residue $R_1$ with a naphthol of the formula

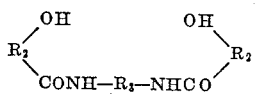

in an organic solvent, if necessary in an aqueous organic solvent, preferably in the presence of an acid.

The aryldiazoamino compounds to be used in accordance with the invention may be obtained by known methods by condensing an aryldiazonium salt with a primary amine or preferably with a secondary amine. A very wide variety of amines are suitable for this purpose, for example aliphatic amines, for example methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethane sulphonic acid, methylaminoethane sulphonic acid, guanylethane sulphonic acid and β-aminoethylsulphuric acid; alicyclic amines, for example cyclohexylamine, N-methylcyclohexylamine and dicyclohexylamine; aromatic amines, for example 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalene-4-sulphonic acid and 1-aminonaphthalene-2,4-disulphonic acid; heterocyclic amines, for example piperidine, morpholine, pyrrolidine, dihydroindole and also sodium cyanamide or dicyanodiamide.

Generally, the diazoamino compounds obtained are sparingly soluble in cold water and, if necessary, may be separated from the reaction medium in a crystalline form after salting out. In many cases, the moist press cake may be used as it is for further reaction. In some cases, it may be advantageous to dehydrate the diazoamino compounds by vacuum drying prior to the reaction, or to remove the water by azeotropic distillation after suspending the moist filter cake in a solvent.

Coupling of the diazoamino compound with the naphthol is carried out in an organic solvent, for example chlorobenzene, ortho-dichlorobenzene, nitrobenzene, pyridine, ethylene glycol, ethylene glycol monomethyl ether or ethylene glycol monoethyl ether, dimethylformamide, formic acid or acetic acid. When using a solvent which is miscible with water, it is not necessary to use the diazoamino compound in an anhydrous form. For example, the water-moist filter cake may be used. Cleavage of the diazoamino compound which precedes coupling is carried out in an acid medium. When a neutral solvent is used it is necessary to add an acid, for example hydrochloric acid, sulphuric acid, formic acid or acetic acid.

Coupling is advantageously carried out with the application of heat, preferably at a temperature within the range of from 80 to 180° C., and it generally proceeds very quickly and is complete.

By virtue of their insolubility, the pigments obtained may be isolated from the reaction mixture by filtration. Since the by-products remain in solution, the pigments are obtained in a very pure form. In the case of pigments that are produced by coupling in an aqueous medium, it is expedient to subject them to an after-treatment with organic solvents. Further advantages of the process of the invention are the high yields of the pigments in a form suitable for use and their constant properties.

By virtue of their advantageous properties, the pigments obtained in accordance with the process of the invention may be used for a very wide variety of purposes. For example, they may be used in a finely divided form for the spin-colouration of filament and staple-fibre viscose, cellulose thers and esters and polyamides, polyurethanes and polyesters, and in the production of coloured lacquers and lake-formers, solutions or products made from cellulose acetate, nitrocellulose, natural or synthetic resins, for example polymerization resins or condensation resins, for example aminoplasts, alkyd resins, and phenoplasts, and also polyolefines, for example polyethylene, polypropylene, polystyrene, polyvinyl chloride, polyacrylonitrile, rubber, casein, silicones and silicone resins. They may also be used advantageously in the manufacture of coloured pencils, cosmetic preparations and laminated sheet material.

German patent specification No. 61,580 discloses a process for the manufacture of disazo pigments that differ from those of the present invention in that they contain as diamine a dihalogeno-meta-phenylenediamine. The pigments obtained in accordance with the present invention possess better fastness to migration than the above-mentioned known pigments.

The following examples illustrate the invention. Unless otherwise stated, the parts and percentages are by weight.

EXAMPLE 1

51.4 parts of an azo dyestuff prepared from diazotized 5-trifluoromethyl-2-benzylsulphonylaniline coupled with 2,3-hydroxynaphthoic acid are stirred in 400 parts of chlorobenzene together with 0.5 part of dimethylformamide and then 10 parts of thionyl chloride are added dropwise at 70 to 75° C. The batch is heated for 2 hours at 110 to 115° C. and allowed to cool. The azo dyestuff carboxylic acid chloride that precipitates is isolated by vacuum filtration, washed with benzene and petroleum ether and then dried in vacuo at 40 to 50° C. 49.5 parts of the azo dyestuff carboxylic acid chloride of the formula

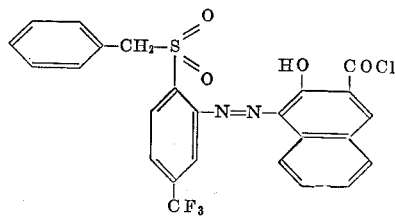

are obtained.

10.65 parts of the acid chloride so obtained are stirred with 200 parts of ortho-dichlorobenzene and then a solution of 2.53 parts of 3,3'-dichloro-4,4'-diaminodiphenyl in 100 parts or ortho-dichlorobenzene and 0.2 part of pyridine is added at 30° C. The batch is heated for 12 hours at 140 to 145° C. while stirring. The uniformly crystalline pigment is isolated by vacuum filtration and washed successively with hot orthodichlorobenzene, methanol and water. It is dried in vacuo at 90 to 100° C. and 11.5 parts of a solf-grained yellowish orange pigment are obtained. The pigment colours synthetic materials, for example polyvinyl chloride, and also lacquers a brilliant yellowish orange shade possessing excellent fastness to migration, overstripe bleeding and light. The pigment corresponds to the formula

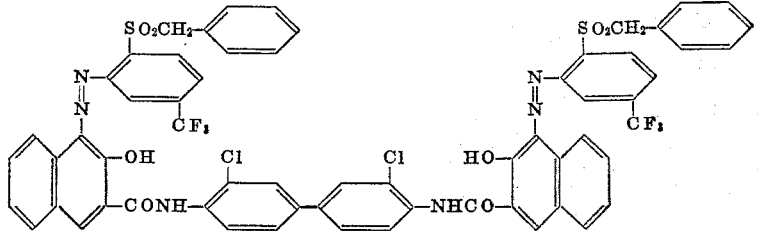

The following table lists components for further acid amide derivatives of azo dyestuffs. The said acid amide derivatives may be obtained by condensing 2 molecules of the acid chloride of an azo dyestuff obtained from a diazo component as listed in Column I and a coupling component as listed in Column II with 1 mol of a diamine as listed in Column III. The shades which the pigments produce in polyvinyl chloride film are indicated in Column IV.

EXAMPLE 2

6.3 parts of 5-trifluoromethyl-2-benzylsulphonylaniline are heated to 70° C. in 200 parts of water and 7.5 parts by volume of 30% hydrochloric acid and the batch is then cooled. Diazotization is carried out at 0 to 2° C. in the usual manner with 5.2 parts by volume of 4 N sodium nitrate solution and the batch is filtered. 1.8 parts of borax in aqueous solution are added to the diazo solution at 0 to 5° C.

Separately from this, 5.94 parts of bis-(2-hydroxy-naphthalene-3-carboxylic acid)-3,3' - dichlorodiphenyl-4, 4'-diamide are dissolved in 20 parts of ethylene glycol monomethyl ether, 200 parts of water and 6 parts by volume of 30% sodium hydroxide solution, and the batch is filtered. The diazo and coupling components can be bulked to the same volume with water, if desired.

The two solutions are fed continuously into a mixing nozzle where coupling takes place instantaneously at a temperature of 15 to 20° C. and at a pH of 8.5 to 9.0. The pigment suspension which forms is filtered and the

| | I | II | III | IV |
|---|---|---|---|---|
| 1 | 5-trifluoromethyl-2-ethylsulphonylaniline | 2,3-hydroxynaphthoic acid | 2,5-dimethyl-1,4-diaminobenzene | Yellowish brown. |
| 2 | do | do | 2,5-dimethoxy-1,4-diaminobenzene | Brown. |
| 3 | do | do | 1,4-diaminobenzene | Yellowish brown. |
| 4 | do | do | 2-chloro-5-methoxy-1,4-diaminobenzene | Brown. |
| 5 | do | do | 2-chloro-1,4-phenylene-diamine | Brownish orange |
| 6 | do | do | 2-chloro-5-methyl-1,4-phenylene-diamine | Orange. |
| 7 | do | do | 2-methoxy-1,4-phenylene-diamine | Brown. |
| 8 | do | do | 2,5-diethoxy-1,4-phenylenediamine | Do. |
| 9 | 5-trifluoromethyl-2-methylsulphonyl-aniline | do | 1,4-phenylenediamine | Reddish orange. |
| 10 | do | do | 2-chloro-1,4-phenylenediamine | Orange. |
| 11 | do | do | 2,5-dichloro-1,4-phenylenediamine | Do. |
| 12 | 3-trifluoromethyl-4-methylsulphonyl-aniline | do | 1,4-phenylenediamine | Reddish orange. |
| 13 | do | do | 2-chloro-1,4-phenylenediamine | Orange. |
| 14 | do | do | 2,5-dichloro-1,4-phenylenediamine | Do. |
| 15 | 5-trifluoromethyl-2-(para-diphenyl)sulphonylaniline | do | do | Do. |
| 16 | do | do | 3,3'-dichloro-4,4'-diaminodiphenyl | Do. |
| 17 | 5-trifluoromethyl-2-(4'-chlorophenyl)-sulphonylaniline | do | 1,4-phenylene-diamine | Scarlet. |
| 18 | do | do | 2-chloro-1,4-phenylenediamine | Reddish orange. |
| 19 | do | do | 2,5-dichloro-1,4-phenylenediamine | Orange. |
| 20 | do | do | 3,3'-dichloro-4,4'-diaminodiphenyl | Do. |
| 21 | 5-trifluoromethyl-2-benzylsulphonyl-aniline | do | 1-4,phenylenediamine | Yellowish brown. |
| 22 | do | do | 2-chloro-1,4-phenylenediamine | Orange. |
| 23 | do | do | 2,5-dichloro-1,4-phenylenediamine | Do. |
| 24 | do | do | 2-methyl-5-chloro-1,4-phenylenediamine | Brown. |
| 25 | do | do | 2,5-dimethyl-1,4-phenylenediamine | Do. |
| 26 | do | do | 2-methoxy-5-chloro-1,4-phenylenediamine | Dark Borwn. |
| 25 | do | do | 2,5-dimethyl-1,4-phenylenediamine | Do. |
| 26 | do | do | 2-methoxy-5-chloro-1,4-phenylenediamine | Dark Brown. |
| 27 | do | do | 4,4'-diaminodiphenyl | Brown. |
| 28 | 5-trifluoromethyl-2-(4'-chlorophenyl)-sulphonylaniline | do | 2-chloro-5-methyl-1,4-phenylenediamine | Do. |
| 29 | do | do | 2-chloro-5-methoxy-1,4-phenylenediamine | Do. |
| 30 | 5-trifluoromethyl-2-(3',4'-dichlorophenyl)-sulphonylaniline | do | 2,5-dichloro-1,4-phenylenediamine | Orange. |
| 31 | do | do | 3,3'-dichloro-4,4'-diaminodiphenyl | Do. |
| 32 | do | do | 3,6,3',6'-tetrachloro-4,4'-diaminodiphenyl | Do. |
| 33 | 3-trifluoromethyl-4-methylsulphonyl-aniline | do | 2,5-dichloro-1,4-phenylenediamine. | Reddish orange. |
| 34 | 3-trifluoromethyl-4-ethylsulphonylaniline | do | 1,4-phenylenediamine | Scarlet. |
| 35 | do | do | 2,5-dichloro-1,4-phenylenediamine | Orange. |
| 36 | do | do | 2,5-dimethyl-1,4-phenylenediamine | Reddish brown. |
| 37 | 3-trifluoromethyl-4-phenylsulphonyl-aniline | do | 2-chloro-1,4-phenylenediamine | Scarlet. |
| 38 | do | do | 2-methoxy-5-chloro-1,4-phenylenediamine | Red. |
| 39 | 3-trifluoromethyl-4-(4'-chlorophenyl)-sulphonylaniline | do | 3,3'-dichloro-4,4'-diaminodiphenyl | Red. |
| 40 | 5-trifluoromethyl-2-(α-naphthyl)-sulphonylaniline | do | 1,4-phenylenediamine | Yellowish brown. |
| 41 | do | do | 3,3'-dichloro-4,4'-diaminodiphenyl | Orange. |
| 42 | 5-trifluoromethyl-2-(β-naphthyl)-sulphonylaniline | 2,3-hydroxynaphthoic acid | 2,5-dimethyl-1,4-phenylenediamine | Brown. |
| 43 | 5-trifluoromethyl-2-(4'-methylphenyl)-sulphonylaniline | 6-bromo-2,3-hydroxy-naphthoic acid. | 3,3'-dichloro-4,4'-diaminodiphenyl | Reddish orange. |
| 44 | 5-trifluoromethyl-2-(2'-methoxyphenyl)-sulphonylaniline | 6-methoxy-2,3-hydroxy naphthoic acid | do | Scarlet. |
| 45 | 5-trifluoromethyl-2-(4'-ethoxyphenyl)-sulphonylaniline | 6-nitro-2,3-hydroxy-naphthoic acid. | do | Orange brown. | filter residue is washed free from salt with hot water. The moist pigment cake is freed from water azeotropically with 200 parts by volume of nitrobenzene while stirring, and is then heated for 2 hours at 180 to 185° C. The pigment is isolated by filtration at 100° C., washed successively with hot nitrobenzene and cold methanol and then dried at 40 to 50° C. It is identical with the product obtained as descirbed in the second paragraph of Example 1.

EXAMPLE 3

7.62 parts of the diazoamino compound of the formula

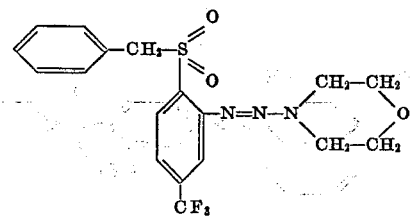

are stirred together wtih 5.17 parts of 2,5-dichloro-1,4-bis-(2'-hydroxy-3'-naphthoylamino)-benzene in 500 parts of orthodichlorobenzene and 5 parts of 100% acetic acid, and the batch is slowly heated to 130 to 135° C. It is stirred for 6 hours at that temperature. The pigment which forms is isolated by vacuum filtration, washed successively with hot ortho-dichlorobenzene, cold methanol and water and then dried in vacuo at 90 to 100° C. 10.2 parts of a soft-grained orange pigment are obtained which colours synthetic materials, for example polyvinyl chloride, an orange shade which is fast to migration and light.

EXAMPLE 4

A mixture is prepared from 65 parts of stabilized polyvinyl chloride, 35 parts of dioctyl phthalate and 0.2 part of the pigment obtained in the manner described in the second paragraph of Example 1 and then worked to and fro for 7 minutes on a two-roller mill at 140° C. An orange film possessing very good fastness to light and migration is obtained.

We claim:

1. A disazo pigment of the formula

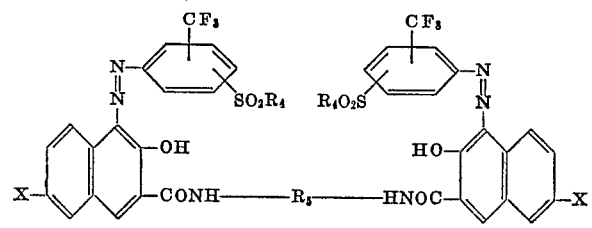

in which X repersents hydrogen, chloro, lower alkoxy, cyano or nitro, $R_4$ is naphthyl, phenyl-lower alkylene, unsubstituted phenyl or phenyl substituted by chloro, lower alkyl, phenyl or lower alkoxy, $R_5$ is a member selected from the group consisting of

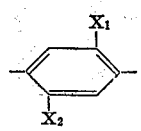

in which $X_1$ and $X_2$ each represents hydrogen, chloro, trifluoromethyl, lower alkyl or lower alkoxy; and

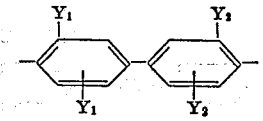

in which each of the symbols $Y_1$ and $Y_2$ represents hydrogen, chloro, lower alkyl or lower alkoxy.

2. A disazo pigment as claimed in claim 1 of the formula

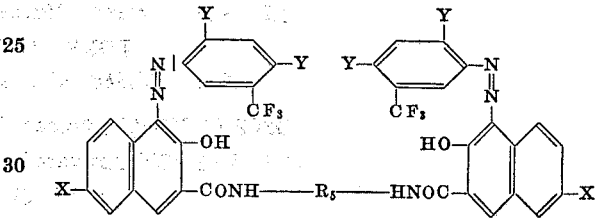

in which one of the symbols Y represents phenyllower-alkylenesulfonyl, phenylsulphonyl or phenylsulfonyl substituted by chloro, lower alkyl or lower alkoxy and the other symbol Y represents a hydrogen atom, X represents hydrogen, chloro, lower alkoxy, cyano or nitro, and $R_5$ is a member selected from the group consisting of

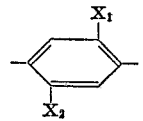

in which $X_1$ and $X_2$ each represents hydrogen, chloro, trifluoromethyl, lower alkyl or lower alkoxy; and

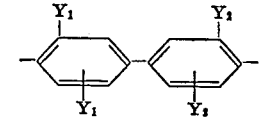

in which each of the symbols $Y_1$ and $Y_2$ represents hydrogen, chloro, lower alkyl or lower alkoxy.

3. The compound as claimed in claim 1 of the formula

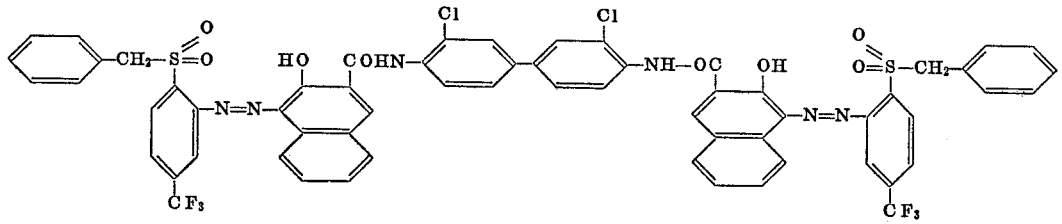

4. The compound as claimed in claim 1 of the formula

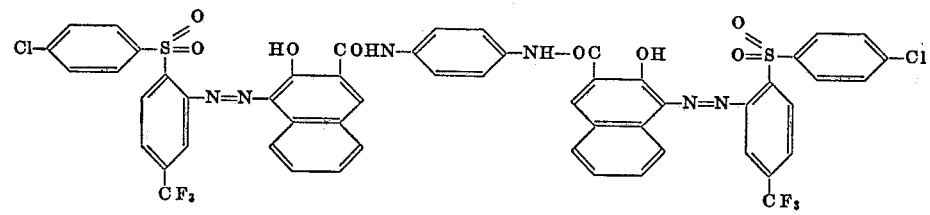

5. The compound as claimed in claim 1 of the formula
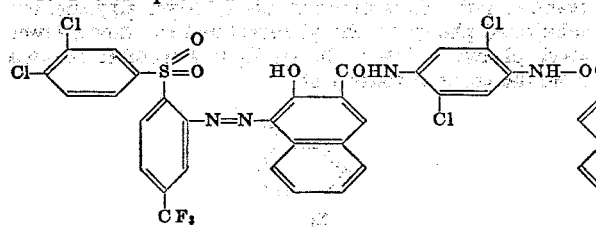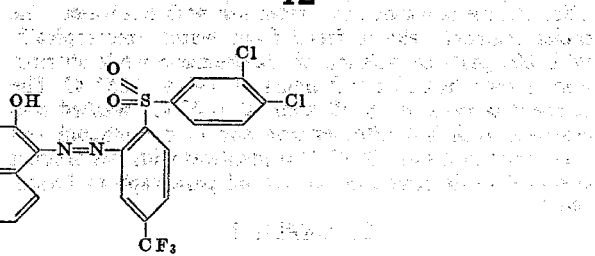
6. The compound as claimed in claim 1 of the formula
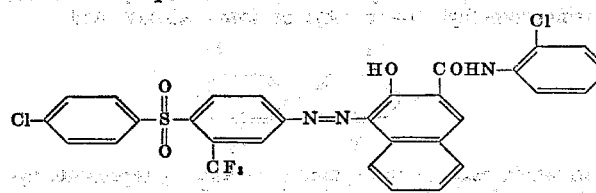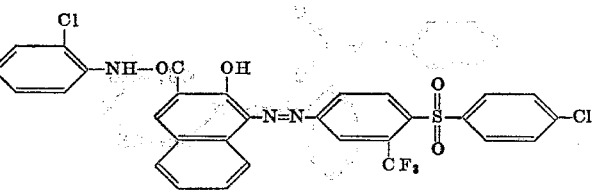
References Cited
UNITED STATES PATENTS
3,262,925  7/1966  Mueller et al. _____ 260—174
FOREIGN PATENTS
61,580  5/1968  Germany _____ 260—184
JOSEPH REBOLD, Primary Examiner
C. F. WARREN, Assistant Examiner
U.S. Cl. X.R.
260—31.8 C, 174, 140, 178, 188, 202, 578, 41 C